J. A. McLANE.
METHOD AND APPARATUS FOR PRODUCING WEFTLESS CLOTH.
APPLICATION FILED MAR. 30, 1921.

1,420,271.

Patented June 20, 1922.
6 SHEETS—SHEET 1.

UNITED STATES PATENT OFFICE.

JOSEPH A. McLANE, OF MORGANTOWN, WEST VIRGINIA.

METHOD AND APPARATUS FOR PRODUCING WEFTLESS CLOTH.

1,420,271.   Specification of Letters Patent.   Patented June 20, 1922.

Application filed March 30, 1921. Serial No. 456,993.

*To all whom it may concern:*

Be it known that I, JOSEPH A. MCLANE, a citizen of the United States, residing at Morgantown, in the county of Monongalia and State of West Virginia, have invented a new and useful Method and Apparatus for Producing Weftless Cloth, of which the following is a specification.

The present invention is a method and apparatus for the manufacture of "weftless cloth," particularly adaptable for the manufacture of pneumatic tire casings and inner tubes, in which the threads or cords are held together by adhesive material, such as rubber. However it is useful for various other purposes.

The object of the invention is to rapidly produce a weftless cord cloth in relatively great widths and continuous lengths wherein the cords or strands therein lie in close but separated parallel relation and are bound together in sheet formation by rubber cement, or other adhesive, all the cords being free from distortion and each being completely insulated from the other by said cement or adhesive, and the sheet being of slightly greater thickness than the diameter of the cords due to the coating of adhesive.

It is also an object of the invention to produce a corded cloth wherein the longitudinal cords or strands therein will be stretched or under tension, in contra-distinction from the mere laying of a cord. Such a cloth is of great utility in the manufacture of the ordinary cord pneumatic tire casing, because its flexibility and pliability facilitates the building of the tire casings by reason of the ease with which it can be applied and stitched around the core and bead.

Many attempts have been made to produce a practical and commercial cloth of the above described character, but for various reasons the products produced have not been commercially successful or suitable for the manufacture for which they are designed. For instance, the cords have not been properly insulated one from the other, the cords have been crushed, flattened, or otherwise ruptured, the cords in the sheet produced have been distorted and improperly spaced at points throughout the length of the sheet, the cords not properly stretched resulting in lack of uniformity of the cords and their binding contact in the completed product and many other drawbacks, all of which render the product commerically unsuitable for manufacturing purposes.

It is the purpose of the present invention to overcome the above mentioned disadvantages and to produce a "weftless cord cloth" composed of a plurality of substantially parallel cords, or other suitable strands of material, which are held together in sheet formation by adhesive material, preferably, as is now used, a rubber cement.

The process for carrying out the invention briefly consists in drawing a plurality of individual cords or strands in sheet formation through a bath of semi-liquid cement, or other suitable adhesive, then aligning cords in slightly spaced relation but sufficiently close that the cement just applied thereto will form a web therebetweeen, then removing any surplus amount of adhesive from the sheet of cords if necessary, then submitting the corded sheet to a drying action and at the proper point in this drying action crowding the threads together laterally into a more intimate relation, but maintaining a thickness of adhesive therebetween. This method also contemplates as one of its features having the cords stretched under tension during the several steps above cited. However, this feature may be omitted without departing from the spirit of this invention.

The invention further resides in a novel apparatus for practicing the method just described, the structure and details of which will be explained hereinafter.

Obviously, the invention permits the utilization of a great variety of instrumentalities for producing the desired results, and it will therefore be understood that, by disclosing herein certain particular forms of structure, I confine myself thereto and to the operation thereby performed, only in so far as they carry into effect the principles of the invention.

The accompanying drawings illustrated the preferred embodiment of the invention, as at present devised, for carrying out the steps of the novel method for producing "weftless cord cloth", but it is to be understood that the apparatus is susceptible to many changes in construction and arrangement of parts without departing from the spirit of the invention.

In the drawings:—

Figures 1 and 1a illustrate a complete top plan view of the apparatus for producing the product of the invention.

Fig. 7 is an elevation of the gathering and spacing reeds shown in Figs. 1a and 2a, Fig. 8 is a sectional view of the reed taken on line 8—8 of Fig. 7, Fig. 9 is an enlarged fragmentary sectional view taken substantially on line 9—9 of Fig. 7, and illustrating the cords passing therethrough, Fig. 10 is an enlarged transverse sectional view of the reed, similar to Fig. 8, and showing the cords passing therethrough as illustrated in Fig. 9, and Fig. 11 is an elevation of the gathering roll.

Referring particularly to the drawings 1 indicates a frame carrying a suitable tank or vat to contain the semi-liquid rubber cement or other suitable adhesive material. Arranged over the vat 2 are a pair of spreading rolls 3 and 4, the roller 3 being adjustable relative to the other by any suitable means, such as for instance, by the sliding block and screw 5. Suitably journaled adjacent the forward edge of the tank is a warp beam 6 having a plurality of strands or cords thereon. The strands or cords 7 are led from the warp beam over a gathering roll 8 adjacent the forward edge of the vat 2. This roll 8 is preferably concaved toward its center and throughout its circumference so that the cords passing thereover and slightly under tension, will be gathered in closer relationship in sheet formation. From this roll 8 the cords pass through a separating reed 9, which spaces each of the cords from contact with the other before passing into the vat of semi-liquid rubber cement 2. The cords pass under a vertical swinging roll 10 within the vat and out through a reel 11 to the spreading rollers 3 and 4. As the cords pass through the reed 11 each individual cord passes between two teeth A of reed, these teeth being preferably set at an inclination to the line of pull of the cords so as to engage and contact with the opposing sides of the cords. This contacting of the teeth A with the cord has a troweling effect to smooth and firmly apply the adhesive, which has accummulated upon the cords, to their side walls as well as to turn back into the vat any excess of the adhesive or cement. The reed 11 also functions to align the cords in parallelism with each other so that they will maintain a parallel relation throughout the remainder of the process.

Figure 1A:
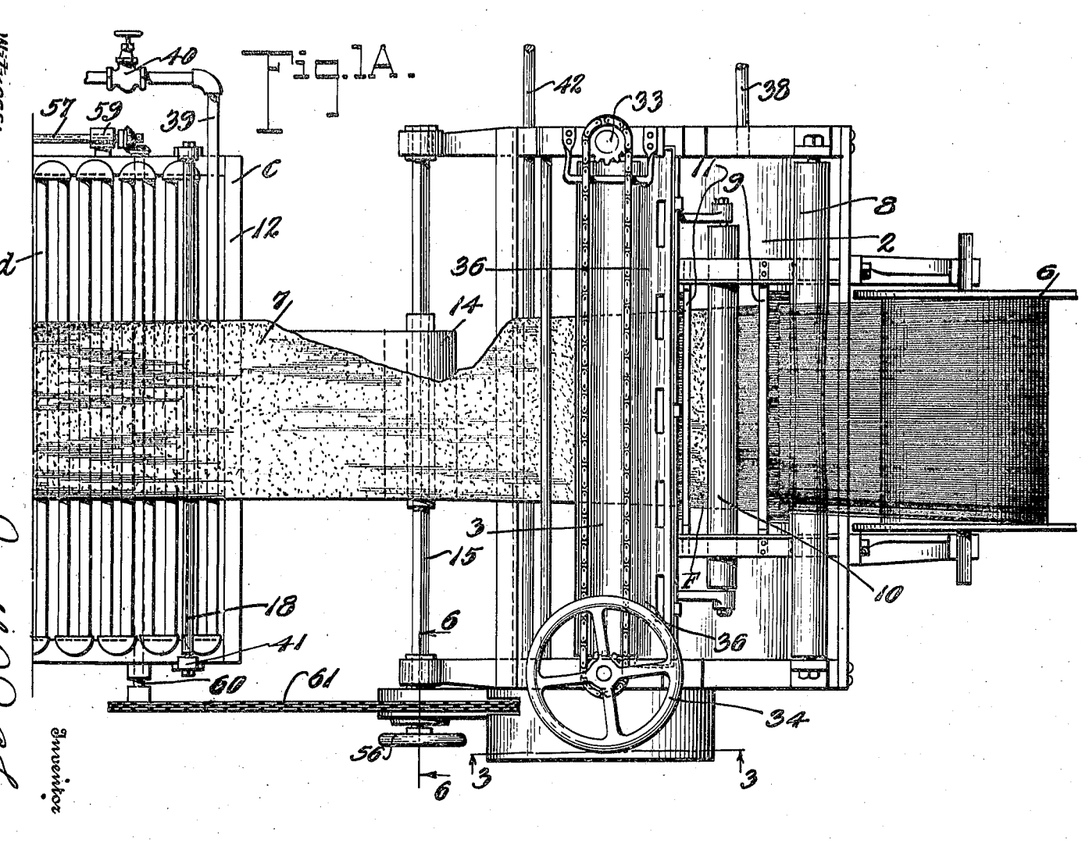
Figures 7, 8, 9, 10, 11, 12:
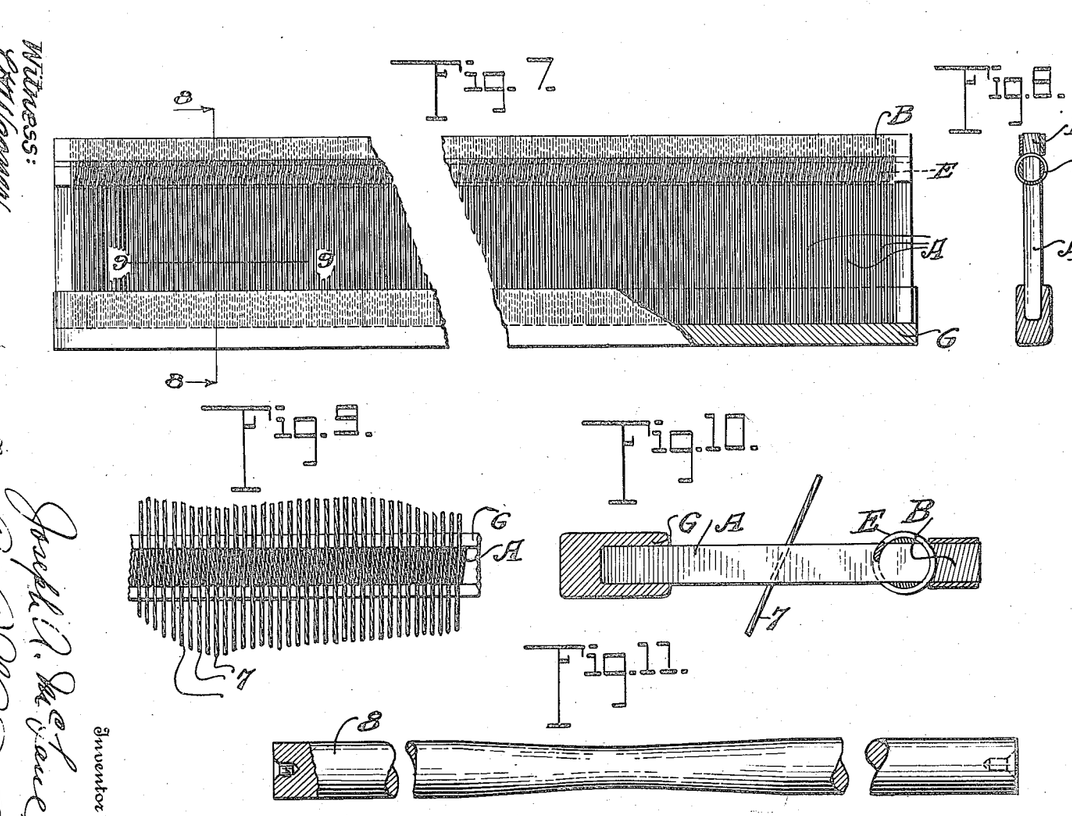

While in Fig. 9 it is shown that the cords before and after passing through the reed 11 are not connected together by the cement or adhesive, this figure being particularly for the purpose of showing clearly the action of the teeth A of the reed 11 on the cords, but the cords have sufficient cement or adhesive thereon after leaving the vat and the reed 11 to cause the cement of one cord to adhere to the other and form a web between each cord as clearly illustrated at F on Fig. 1a.

From the reed 11 the sheet of coated cords pass between the rollers 3 and 4. These rollers are not calendaring rollers in the sense that they press the rubber cement into the cords or the cords into the rubber, but are sufficiently spaced apart so as to only permit a predetermined thickness of the cement to pass therethrough on the upper and lower sides of the corded sheet and to express the surplus in front of rollers back into the vat 2, and at the same time spreading the adhesive throughout the area of the sheet passing therebetween, thereby maintaining the sheet of desired and uniform thickness.

From the rollers 3 and 4 the corded sheet is thus advanced over a drier 12, around a roller 13 at the outer end of the drier and back underneath the drier where it is wound on a beam 14, mounted on a driven shaft 15. As the finished weftless corded cloth 7 is wound on the beam 14, a liner 16 is wound between its convolutions and is supplied from a drum or reel 17 suitably journaled, in the present instance, under the drier 12.

The roller 13 is positively driven to draw the corded sheet over the drier 12 and to assist the winding beam 14 to maintain a tension on the cords of the sheet throughout the entire process. The drier consists of the frame c having a horizontal series of heating coils d thereon. Spaced from the heating coils d, both on its upper and under surface, are arranged a spaced series of transverse supporting rollers 18 over which the cloth 7 moves and by which it is held in proper spaced relation and out of contact with the heating coils D.

Arranged over the drier 12, preferably at its outer or rear end portion is a gathering guide 19 extending preferably, transversely of the cloth 7. This gathering guide 19 is longitudinally adjustable of the drier on tracks 20 in order that it may be positioned at any desired point along the length of the drier. While in the drawings the tracks 20 are not shown extending throughout the entire length of the drier, it is to be understood that the invention contemplates the adjustment of the saddle at any point on the drier.

Figures 2, 12:
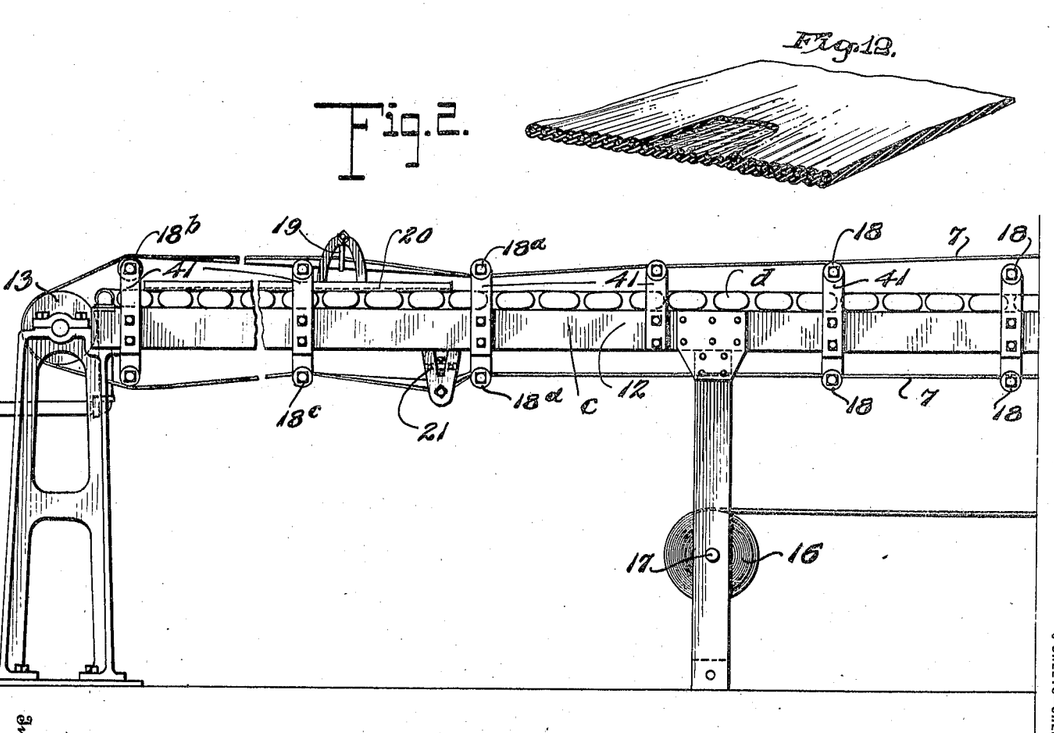
Figs. 2 and 2a illustrate the apparatus, as shown in Figs. 1 and 1a, in side elevation.
Figure 12 is a fragmentary view of the cloth product produced by the process and apparatus herein described and shown.
Figure 2A:
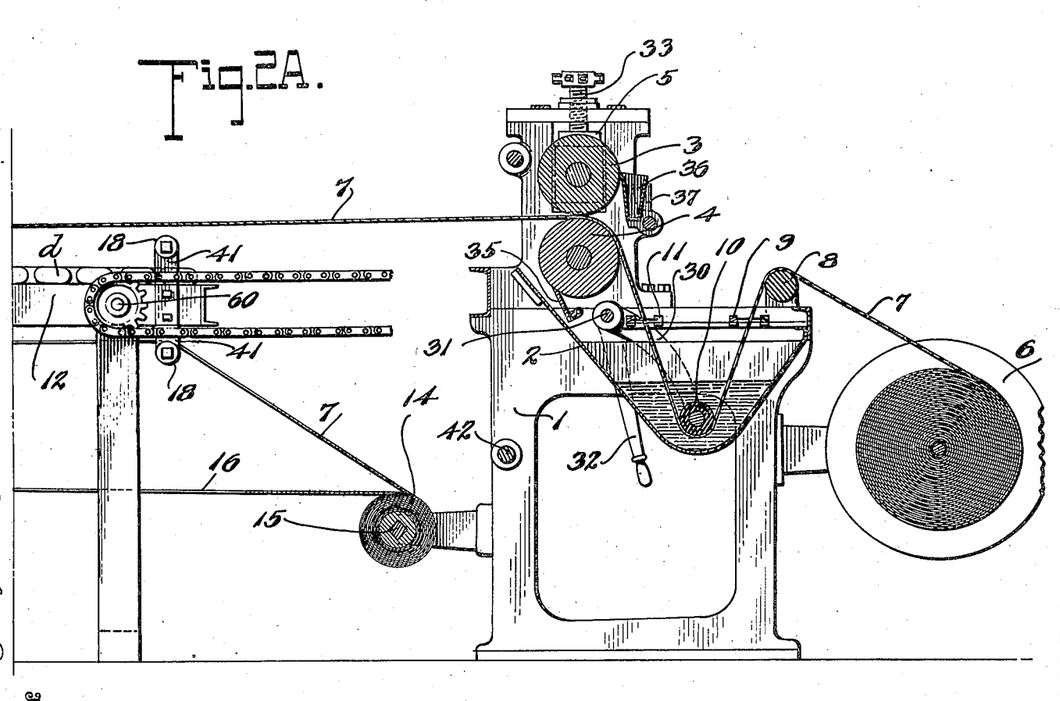

With the apparatus which applicant now has in practice, the corded sheet is maintained in a substantially horizontal position until the rubber cement or adhesive has dried out to a determined degree, but the sheet may be fed from the rollers 3 and 4 to any desired position. The cloth passes over the concaved or V-shaped gathering guide 19 which cooperates with the rollers 18$^a$, 18$^b$ and drawing roller 13, which will presently appear. From Figs. 1 and 2 it will be observed that the cloth comes from the spreading rollers 3 and 4 and runs over the rollers 18 until the desired point of drying, above referred to is approximately reached, then the fabric is run under the last adjacent roller, such as at 18$^a$, and over the guide 19 and thence over the roller 18$^b$ to the draw roller 13. This particular threading of the cloth causes a slightly greater degree of tension thereon between the rollers 18$^a$ and 18$^b$, by reason of the elevation of the guide, so that as the cloth passes over the concaved or substantially V-shaped gathering guide, which is interposed between the rollers 18$^a$ and 18$^b$, the cloth on each of its medial lines is canted to increase progressively and outwardly the tension on the cord, the tension increasing in proportion to the degree in which the cords are guided out of the normal plane of travel.

Thus, the result is that this tension causes a pressure to be applied transversely and inwardly to move or crowd the cords to the center of the cloth in more closer together but in spaced and separated relation, the cords farthest from the center receiving a greater pressure to correspond to their need for greater movement. This action can be observed particularly from Figs. 1 and 1$^a$ which show that the cloth progressively narrows from the spreading rollers 3 and 4 to the draw roller 13. From Fig. 2 it will be seen that this canting and tensioning action is made gradual as the cloth approaches the guide 19 and is gradually decreased until the cloth assumes its flattened form as it approaches the roller 18$^b$. By reason of the fact that the guide 19 is positioned at a point in the drying of the cloth where the adhesive or binder has been dried out to a degree, the cords 7 cannot be moved together into intimate contact because of the substantially hardened condition of the adhesive, the cords always being spaced apart, one from the other, by a substantial thickness of the adhesive or binder as clearly shown in Figs. 5 and 12. The cloth thence passes around the roller 13 which tends to firm it in its contracted form. From the roller 13 the cloth again passes over a second gathering guide 21 of substantially the same construction as the guide 19, but inverted and suspended from the under face of the drier. The guide 21 in some cases may be entirely eliminated but is provided to maintain the cords in their crowded parallel relation at the point immediately before the rubber cement or adhesive has lost its plastic condition, and insuring its travel to the winding beam 14 without disruption or distortion. The cloth passing over the guide 21 is threaded over the rollers 18$^c$ and 18$^d$ in a manner similar to the threading over the rollers 18$^a$ and 18$^b$. From the guide 21 the cloth passes over the supporting rollers 18 in close proximity to the heating coils and is thoroughly dried. The guide 19, as well as the guide 21, is of primary importance in the present process and manufacture of the product because it crowds or moves the cords together in their proper parallel and equally spaced relation, and make for that degree of uniformity necessary to produce a perfect product in widths and lengths for commercial purposes.

The claims for this invention are those of extreme simplicity, the cheapness by which the product can be manufactured, the unfailing reliability with which the product can be produced, the rapidity of production, and finally the production of a cloth of the nature above described which fulfills the present wants in the manufacture of automobile tire casings, inner tubes, belting and numerous other uses.

As to the details of apparatus:—The frame 1 preferably supports the vat 2 which may be of any preferred formation, and at the forward edge of the vat is journaled the roller 8 which is concaved throughout its circumference from its ends toward its center, as clearly illustrated in Fig. 11. The length of the concave portion of the roller 8 is always substantially equal to the width of the warp beam 6 so that the cords received therefrom will be properly gathered in sheet formation. The warp beam 6 is, preferably, journaled on the frame 1 and below the roller 8 in the manner illustrated in the drawings. The spacing reed 9 is positioned between the roller 8 and the adhesive in the vat 2 and the reed 11 is positioned between the adhesive in the vat and the rollers 3 and 4, these reeds being supported in any suitable manner on the frame 1. The roller 10 is submerged in the vat 2 and is carried by the arms 30 pivoted at 31 on the frame 1. A hand lever 32 is provided to raise the roller 10 out of the vat when desired. The roller 10, as can be observed from the drawings, is preferably suspended under its own weight and maintains a yieldable tension on the cords 7 between the beam 6 and the spreading and measuring rollers 3 and 4.

The reeds 9 and 11 each comprise a row of equally spaced teeth A bound together at one of their ends as at B. The spacing of the teeth is effected by interposing between each tooth between adjacent convolutions of a coil of wire E, the wire being of equal diameter throughout its length. The other ends of the teeth are provided with a removable cap bar G, which is removed when the cords are threaded through the machine and is replaced when the machine is put in operation, in order to prevent any accidental disengagement of the cords from the reed. By reason of the teeth A being spaced by the convolutions of the wire coil E, the teeth are set at an angle relative to the bound edge B of the reeds and also to the line of pull of the cords 7. As has been previously explained, this permits the teeth of the reed 11 to apply the rubber cement or adhesive on the opposing sides of the cords as they pass therethrough, thus insuring that the cords will each be properly insulated one from the other in the finished product. The edges of the reed are preferably rounded so as not to cut or chafe the cords as they pass therethrough.

The spreading or measuring rollers 3 and 4, in contradistinction to calendar rollers, are mounted, preferably, in superposed relation on the frame 1 and above the reed 11. The roller 4 is preferably fixedly journaled in the frame, while the roller 3 is slidably mounted in blocks 5, which are adjustable by means of screws 33. A single hand-wheel 34 may be provided for effecting this adjustment, as indicated in Fig. 1ª. The rollers are to be adjusted at a determined distance apart, this distance being slightly greater than the diameter of the cords 7, in order that the cords will not be mashed, crushed or flattened, or otherwise distorted, but will retain their cylindrical formation. These rollers serve to spread the liquid cement or adhesive, which adheres to the cords in the vat 2, over the entire sheet and restricts the amount which passes therethrough.

A suitable scraper 35 is provided to keep the roller 4 clean and to turn back to the vat any accumulation of adhesive which may adhere thereto. The roller 3 is likewise provided with a cup-like scraper 36 which is provided with an open bottom 37 to permit the scrapings to be turned back into the vat. The scrapers 35 and 36 are each fixedly mounted in order that they may be moved from engagement with the rollers if desired.

The vat 2 is supplied with the liquid compound through the pipe 38.

Beyond the frame 1 is the drier 12, which is in the form of a drying table having the horizontal series of heated coils D thereon. The heated coil is supplied with suitable heating medium, such as steam or hot water supplied by the pipe 39 controlled by the valve 40. The rollers 18 are suitably journaled in the ends of the brackets 41 which are secured to the sides of the table and project above and beneath the surface of the heated coil D. The rollers are preferably journaled in anti-frictional bearings for reducing the friction which would be caused by the drawing of the cloth 7 thereover. The winding shaft 15 is preferably journaled on the rear end of the frame 1, but can be mounted in any desired location adjacent the front end of the drier 12.

The entire apparatus is driven from a drive shaft 42 journaled, preferably, in the frame 1, and carries thereon a gear 43 meshing with the gear 44 on the shaft 45 of the spreading roller 4. The gear 44 in turn meshes with the gear 46 fixed on the shaft 47 of the other spreading roller 3. The teeth of the gears 44 and 46 are a sufficient length to permit of the adjustment necessary between the rollers 3 and 4, and these gears are also of the same diameter in order that the rollers 3 and 4 will be positively driven at equal surface speeds. The gear 43 on the drive shaft 42 also drives the sprocket wheel 48 through the gears 49 and 50. The sprocket chain 51 connects the wheel 48 with the sprocket wheel 52 loosely journaled on the winding shaft 15. The sprocket wheel 52 has a frictional driving connection with the shaft 15 through the discs 53 and 54 which are yieldably held in frictional contact with the wheel by the spring 55. The tension of the spring 55 may be regulated by the hand wheel 56. While the specific form of friction clutch or drive is shown in the drawings, any other frictional drive can be substituted therefor, the object being to permit slippage between the winding shaft 15 and the positively driven sprocket 52 so that a proper tension can be exerted on the fabric to draw it through the machine and at the same time compensate for the increased diameter of the fabric on the winding beam 14. While a manually controlled hand wheel 56 is shown for regulating the friction between the shaft and the sprocket 52, any automatic means may be substituted in its stead.

Figures 3, 4, 5, 6:
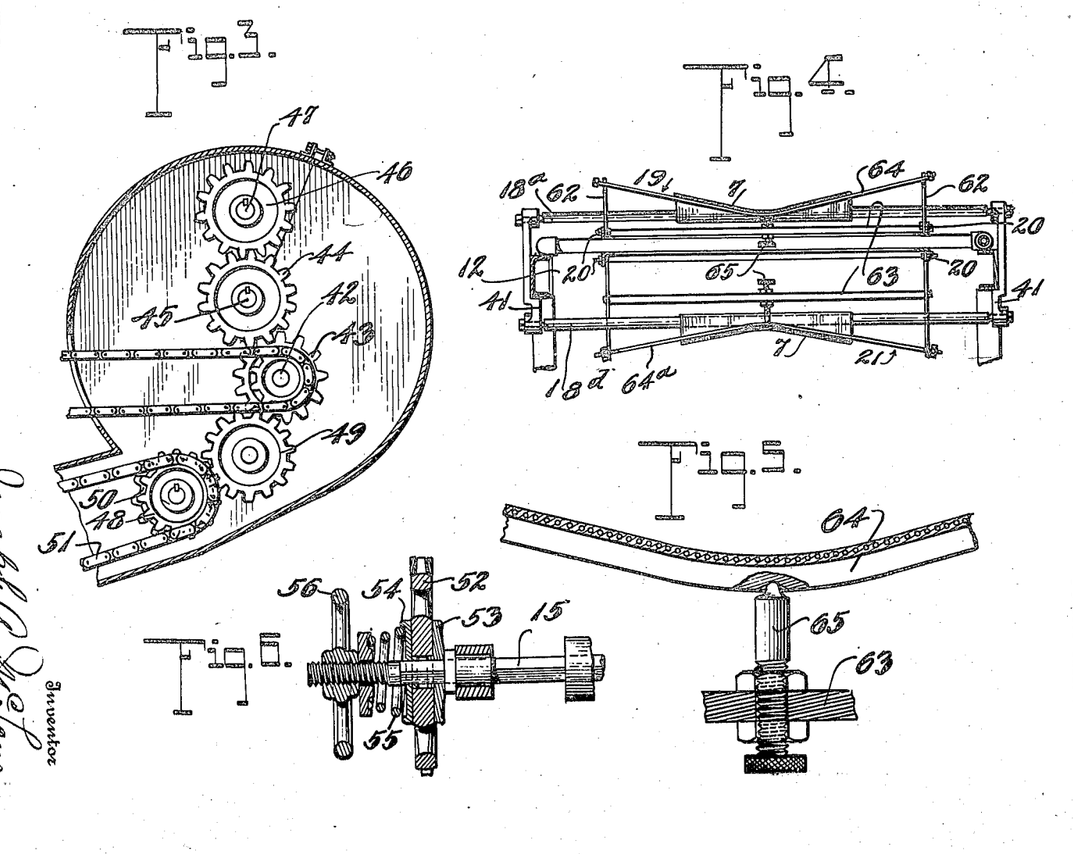
Fig. 3 is a fragmentary sectional view taken on lines 3—3 of Fig. 1a illustrating driving gearing.
Fig. 4 is a section taken substantially on line 4—4 of Fig. 1, illustrating the gathering guide.
Fig. 5 is an enlarged detail fragmentary view of adjusting means for the gathering guide shown in Fig. 4.
Fig. 6 is a sectional view through a friction driving clutch.

The draw roller 13 is positively rotated at a surface speed slightly in excess of the rollers 3 and 4, the excess only being sufficient to draw the cords 7 of the fabric taut and to place a tension thereon in order that the cord will be in stretched condition in the finished cloth. The winding shaft 15 is rotated at a sufficient rate of speed, by reason of the frictional drive, just referred to, to maintain sufficient tension on the cloth between it and the draw roller 13. The draw roller is preferably rotated by means of a shaft 57 geared to the shaft 58 of the roller 13. The shaft 57 extends longitudinally of the drier and is journaled in bearings 59 on one side of the drier. A transverse shaft 60 connects the shaft 57 with the drive shaft 42 through a sprocket chain 61, as shown in Figs. 1ª and 3.

The gathering guide 19 may be of any suitable construction to accomplish results above set forth, but is herein shown as consisting of a frame having sides 62 connected by base rods 63. The guide itself consists, preferably, of a smooth resilient rod 64 concaved or bent to substantially synclinal formation with a rounded bottom, as clearly shown in Fig. 4. The ends of the rod 64 are loosely received in openings in the upper ends of the frame 62. The base rod 63 has threaded therein the adjusting bolt 65 which has one end engaging in a suitable notch at the center of the gathering rod 64. Thus, by adjusting the bolt 65 upwardly, the rod 64 is straightened to reduce the angle thereof and thereby regulate the spacing between the cords in the finished cloth; or in other words, the number of cords to the inch. Any other form of gathering guide 19 may be used which will accomplish purposes above set forth.

The guide 21 is identically of the same construction as the guide 19, but the rod 64ª thereof is in inverted position to the rod 64 of the guide 19, for the purposes stated. Each of the guides is adjustable along the tracks or guideways 20 to the proper point on the drier, where the gathering action of the cords is most efficiently accomplished and desired, during the drying of the cloth.

The apparatus and process above described is not limited to any length or width of cloth. The apparatus now in use produces the cloth in perfect condition free of selvage wastes with each cord thoroughly impregnated with the rubber cement, and completely enveloped thereby, being thoroughly insulated from each other and equidistant apart in side by side parallel relation, with a substantial thickness of the adhesive material between and separating each cord.

Throughout the specification and claims the term bath is intended to include any means whereby the cords or strands will be coated by being immersed in a quantity of adhesive, drawn through a quantity of adhesive or has adhesive poured thereupon, in contradistinction to having the adhesive applied thereto.

From the foregoing a thorough understanding of the process and the apparatus for carrying out the invention may be had, but the apparatus shown and described is capable of many changes and refinements in construction without departing from the spirit and scope of the invention.

In addition to the foregoing characteristics which are present in the cloth, the cloth produced under this process and means differs from other like products in that the cords or threads, besides being in parallel, close and uniform relationship, have been placed in such relationship in the surrounding rubber under tension and fully stretched and remain stretched during the drying of the rubber or adhesive so that in the completed article their reaction is such as to place them under a transverse compression of the rubber body.

Having thus described my invention, what is claimed as new and upon which is desired to secure Letters Patent is:—

1. The process of producing a weftless cloth comprising drawing a plurality of flexible strands in sheet formation through a bath of adhesive elastic material, maintaining the strands separated by substantial distances whereby the adhesive material will form a web therebetween, and drying the adhesive material to form the finished product, with a substantial thickness of said adhesive elastic material therebetween.

2. A process for producing weftless cloth comprising advancing a plurality of longitudinal flexible strands in sheet formation through a bath of adhesive elastic material whereby a coating of adhesive elastic material will surround each strand, maintaining said strands in spaced relation while passing through the bath whereby the adhesive will form a web therebetween, and drying the adhesive material while the strands are in spaced relation with the webs therebetween to form a finished product, with the strands each enveloped by the adhesive and separated from each other by a substantial thickness of the adhesive material.

3. A process for producing cloth having a body of rubber, which comprises advancing a plurality of longitudinal flexible strands in spaced relation and in sheet formation through a bath of rubber in solution whereby a coating of the solution will surround each strand, maintaining said strands in spaced relation throughout the bath to provide a web of the solution between each strand to form an integral sheet, and drying the adhesive material while the strands are in said spaced relation connected by said webs to form a finished product with the strands out of contact and separated from each other by a substantial thickness of the rubber.

4. The method of producing an elastic cloth having an elastic reenforced body, which method consists in causing a multiplicity of threads to travel in spaced relation side by side, applying to each thread rubber or other elastic material in solution to completely coat the same therewith, causing the threads when coated to maintain their spaced relation and the coating material to be pressed into the spaces between the threads to fill the same to form a sheet, drying the sheet while the threads are maintained out of contact one with the other to a point where the coating filling between the threads sets sufficiently to prevent the threads from being moved into intimate contact with each other.

5. The method of producing a weftless cloth in which the threads are held together by an elastic material, as rubber, which method consists in causing a multiplicity of threads to travel under tension in side by side spaced relation, applying to each thread during said travel rubber or other elastic material in solution to thoroughly provide each thread with a coating of solution, drying the coated threads during travel, pressing the coating material carried by the separated threads during drying to fill the spaces between them and unite them into sheet formation, and during the drying of the sheet causing the threads to be crowded closer together in their spaced relation.

6. A process for producing weftless cloth which includes advancing a multiplicity of longitudinal strands, applying a coating of elastic adhesive material to each strand, causing the coated strands to travel in sheet formation under tension and in such relation that the adhesive on the strands will adhere to the adjacent strands, thus forming a web therebetween to produce cloth, then drying the adhesive while the strands are under tension, and causing the strands on the sheet to crowd against each other inwardly toward the center of the sheet at a point in said travel of the sheet during drying.

7. A process for producing weftless cloth which includes advancing a multiplicity of longitudinal strands into adhesive elastic material in solution, causing the coated strands to travel in sheet formation under tension and in such relation that the adhesive on the strands will adhere to the adjacent strands, thus forming a web therebetween to produce cloth, then drying the adhesive while the strands are under tension, and causing the strands of the sheet to crowd against each other inwardly from the sides of the sheet toward the center thereof while the strands are under tension and at a point in the travel of the sheet during drying, and finally causing the sheet to again travel in flattened form.

8. A process for producing weftless cloth which includes advancing a multiplicity of longitudinal strands, applying a coating of elastic adhesive material to each strand, causing the coated strands to travel in sheet formation in such relation that the adhesive on the strands will adhere to the adjacent strands, thus forming a web therebetween to produce the cloth, then drying the adhesive, and causing the strands on the sheet to crowd against each other inwardly toward the center of the sheet at a point in said travel of the sheet during the drying.

9. The method of producing a weftless cloth in which the threads are held together by adhesive material, which method consists in applying to the threads rubber or other adhesive in solution, then causing the threads to travel in sheet formation under tension, and during the travel of the same and at a point where the same is sufficiently dry causing the sheet to be transversely tilted in its traveling plane, whereby a pressure is produced to cause each thread to slightly press toward its adjacent thread, thereby preventing separation during the process of drying.

10. The method of producing a weftless cloth in which the threads are held together by adhesive elastic material, which method consists in applying to the threads rubber or other elastic adhesive in solution, then causing the threads so treated to travel in sheet formation under tension, and during the travel of the same and at a point in said travel where the same is sufficiently dry to cause the sheet to assume a trough-like form, whereby the threads under the action of the varying tension upon each will tend to crowd them against each other toward the center of the sheet, and finally causing the sheet to again travel in flattened form.

11. The method of producing a weftless cloth in which the threads are held together by adhesive material, which method consists in applying to the threads rubber or other elastic adhesive in solution, then causing the threads so treated to travel in flat sheet formation under tension during drying, and during the travel of the same causing the sheet to cant from its normal line of travel and then rolling the sheet flat.

12. The method of producing a weftless cloth in which the threads are held together by adhesive material, which method consists in applying to the threads rubber or other elastic adhesive in solution, then causing the threads so treated to travel in flat sheet formation under tension during drying, during the travel of the same causing the sheet to assume a canted position, then rolling the sheet flat, then again causing the sheet to assume at a point of its travel a canted formation, and finally bringing same into flat formation.

13. The method of producing a weftless cloth in which the threads are held together by adhesive material, which method consists in applying to the threads rubber or other elastic adhesive in solution, then causing the threads so treated to pass in parallel arrangement between rollers to maintain the same in sheet formation and to travel under tension therefrom, and during the travel of the same therefrom and during the process of drying the same causing the sheet to be canted, and then causing the sheet while in a plastic condition to pass over a firming roller and while the threads are maintained in their close arrangements by the canting of the sheet.

14. The method of producing a weftless cloth in which the threads are held together by adhesive material, which method consists in applying to the threads rubber or other elastic adhesive in solution, subsequently causing the threads so treated to travel in close parallel sheet formation, causing the material of the solution adhering between the threads to be dragged along the meeting sides of the threads, then causing the sheet formed by the threads and its adhering material to pass between rolls to compress the same uniformly and squeeze therefrom all surplus material, then causing the sheet so formed to travel under tension in the process of drying and during said travel to be deflected out of its flat formation into a trough-like formation to cause the threads to press inwardly of the sheet, and finally rolling the sheet flat.

15. In an apparatus for producing a weftless cloth in which the threads are held together by adhesive material, the combination with means for coating a multiplicity of threads with rubber or other adhesive material in plastic solution, of means for causing the coated threads to travel in sheets or band-formation, means for drying the coating material carried by the threads and during the travel of the sheet or band, and guide means over which said sheet or band passes, adapted to engage the same at a suitable point of the travel to cause the sheet or band to assume a gradually increasing and decreasing transversely bent form, whereby the coated threads are forced together in close arrangement and maintained in such arrangement in the cured product.

16. In an apparatus for producing a weftless cloth in which the threads are held together by adhesive material, the combination with means for coating a multiplicity of threads with rubber or other adhesive material, in solution, of means for causing the coated threads to travel in sheet or band formation, means for drying the coating material carried by the threads, during the travel of the sheet or band, and guide means adapted to engage the traveling sheet or band at a suitable point in its travel to cause the same to be gradually bent transversely while under tension, whereby to contract the width of the sheet or band during drying, and means for flattening the contracted sheet or band.

17. In an apparatus for producing a weftless cloth in which the threads are held together by adhesive material, the combination with means for coating a multiplicity of threads with rubber or other adhesive material in solution, of means for causing the coated threads to travel in sheet or band formation, means for drying the coating material carried by the threads, during the travel of the sheet or band, and means for applying a transverse, inward pressure to the sheet or band during its travel and at a stage thereof when the coating material is sufficiently dry to permit retention of sheet form.

18. In an apparatus for producing a weftless cloth in which the threads are held together by adhesive material, the combination with means for coating a multiplicity of threads with rubber or other adhesive material in solution, of means for causing the coated threads to travel in sheet or band formation and under tension, and means for causing the sheet or band to assume a bent form transversely while drying, whereby the threads are forced toward the medial line of the sheet or band under a lateral pressure that varies with the degree to which each thread is forced out of the normal plane of travel.

19. In an apparatus for producing a weftless cloth in which the threads are held together by adhesive material, the combination with means for coating a multiplicity of threads with rubber or other adhesive material in solution, of means for causing the coated threads to travel in sheets or band formation, means for drying the coating material carried by the threads and during the travel of the sheet or band, and a guide arranged transversely to the travel of the sheet or band over which the same is drawn, said guide comprising downwardly converging portions, whereby the threads contacting therewith are caused to crowd together under the combined influence of gravity and the pulling tension of the sheet or band.

20. In an apparatus for producing weftless cloth in which the threads are held together by adhesive material, the combination with means for coating a plurality of threads with rubber or other adhesive material in solution, of means for causing the coated threads to travel under tension in sheet formation during drying, means for applying a pressure transversely to the cords and inwardly of the sheet, whereby to contract the sheet, and means for applying a pressure over the entire surface of the sheet to firm it in its contracted form.

21. In an apparatus for producing weftless cloth in which the threads are held together by adhesive material, the combination with means for coating a multiplicity of threads with rubber or other adhesive material in solution, of means for causing the coated threads to travel in sheet or band formation, means for contracting the sheet, means for applying pressure over the entire surface of the sheet to firm it in its contracted form, and means for applying a transverse inward pressure to the sheet after such firming, to maintain the contracted form of the sheet while further drying.

22. In an apparatus for producing weftless cloth in which the threads are held together by adhesive material, the combination of means for coating a multiplicity of strands with rubber or other adhesive material in solution, of means for causing the coated threads to travel in sheet or band formation, of means for drying the sheet, rollers remote from the coating means and about which said sheet is threaded under tension from said coating means, and a contracting guide arranged intermediate said rollers, over which guide the sheet is drawn under tension while drying, whereby the strands of the sheet are moved toward each other.

23. In an apparatus for producing a weftless cloth in which the threads are held together by adhesive material, the combination with means for coating a multiplicity of threads with rubber or other adhesive material in solution, of means for causing the coated threads to travel in sheet or band formation, rollers under which the sheet travels under tension, a contracting guide having downwardly converging sides, over which the sheet is drawn to contract the same during drying.

24. In an apparatus for producing a weftless cloth in which the threads are held together by adhesive material, the combination with means for coating a multiplicity of threads with rubber or other adhesive material in solution, of means for causing the coated threads to travel in sheet or band formation, means for applying pressure transversely and inwardly to the threads for contracting the sheet or band, said means being adjustable to various points along the line of travel of the sheet or band.

25. In an apparatus for producing a weftless cloth in which the threads are held together by adhesive material, the combination with means for coating a multiplicity of threads with rubber or other adhesive material in solution, of means for causing the coated threads to travel in sheet or band formation, and means for applying pressure transversely and inwardly to the threads, said means being adjustable to and from the normal plane of travel to vary the tension applied thereby upon the sheet or band.

26. In an apparatus for producing a weftless cloth in which the threads are held together by adhesive material, the combination with means for coating a multiplicity of threads with rubber or other adhesive material in solution, of means for causing the coated threads to travel in sheet or band formation, a heater for drying the sheet or band over and under which the said sheet or band travels, means located above said heater for canting the sheet or band to contract the same, a roller for flattening the canted bands, and means located under the heater for canting the sheets or bands while drawn thereunder to maintain the same in contracted form while drying.

27. In an apparatus for producing a weftless cloth in which the threads are held together by adhesive material, a tank for containing a supply of rubber or other adhesive material in solution, means for drawing a multiplicity of threads through the solution in said tank, a reed or comb between the blades of which the said threads are caused to travel to space the same, said blades being arranged to apply pressure against the threads to spread the material on the inner faces thereof, means for causing the coated threads to travel in sheet formation, means for drying the same during travel, and means for firming the sheet during the process of drying.

28. In an apparatus for producing a weftless cloth in which the threads are held together by adhesive material, a tank for containing a supply of rubber or other adhesive material in solution, means for drawing a multiplicity of threads through the solution in said tank, a reed or comb in which the blades thereof are transversely inclined and between which individual threads pass, whereby the material between the threads is spread firmly thereon, means for causing the coated threads to travel in sheet formation, and means for drying the same during travel.

29. In an apparatus for producing a weftless cloth in which the threads are held together by adhesive material, a tank for containing a supply of rubber or other adhesive material in solution, means for drawing a multiplicity of threads through the solution in said tank, a reed or comb in which the blades extend obliquely across the line of travel of the threads, whereby to space apart the individual threads and present a larger spreading surface against the threads, means for causing the coated threads to travel in sheet formation, and means for drying the same during travel.

30. An apparatus for producing weftless cloth of the kind described, including in combination, means for maintaining a bath of adhesive solution, means for advancing a multiplicity of longitudinal threads through the bath, means for maintaining each thread spaced and separated from the other throughout the passage of the threads through the bath to cause a web of adhesive solution to form between adjacent spaced threads providing an integral sheet, means for causing the coated threads to travel in spaced and substantially parallel relation, and means for drying said solution while the threads are traveling in said spaced relation.

31. An apparatus for producing weftless cloth of the kind described, including in combination, means for maintaining a bath of adhesive solution, means for advancing a multiplicity of longitudinal threads through the bath, means for maintaining each thread spaced and separated from the other throughout the passage of the threads through the bath to cause a web of the adhesive solution to form between adjacent spaced threads, means for causing said coated threads to travel in sheet formation and said spaced relation from said bath, means for spreading the excess solution into the spaces between said threads, and means for drying said solution while the threads are maintained in their spaced relation to produce an integral cloth having the threads independently coated and held together by a substantial thickness of rubber therebetween.

In testimony whereof I have hereunto set my hand.

JOSEPH A. McLANE.